Nov. 22, 1960 E. F. WEBB 2,961,168
NOZZLE DEVICE FOR WINDSHIELD CLEARING SYSTEMS
Filed April 26, 1957 2 Sheets-Sheet 1
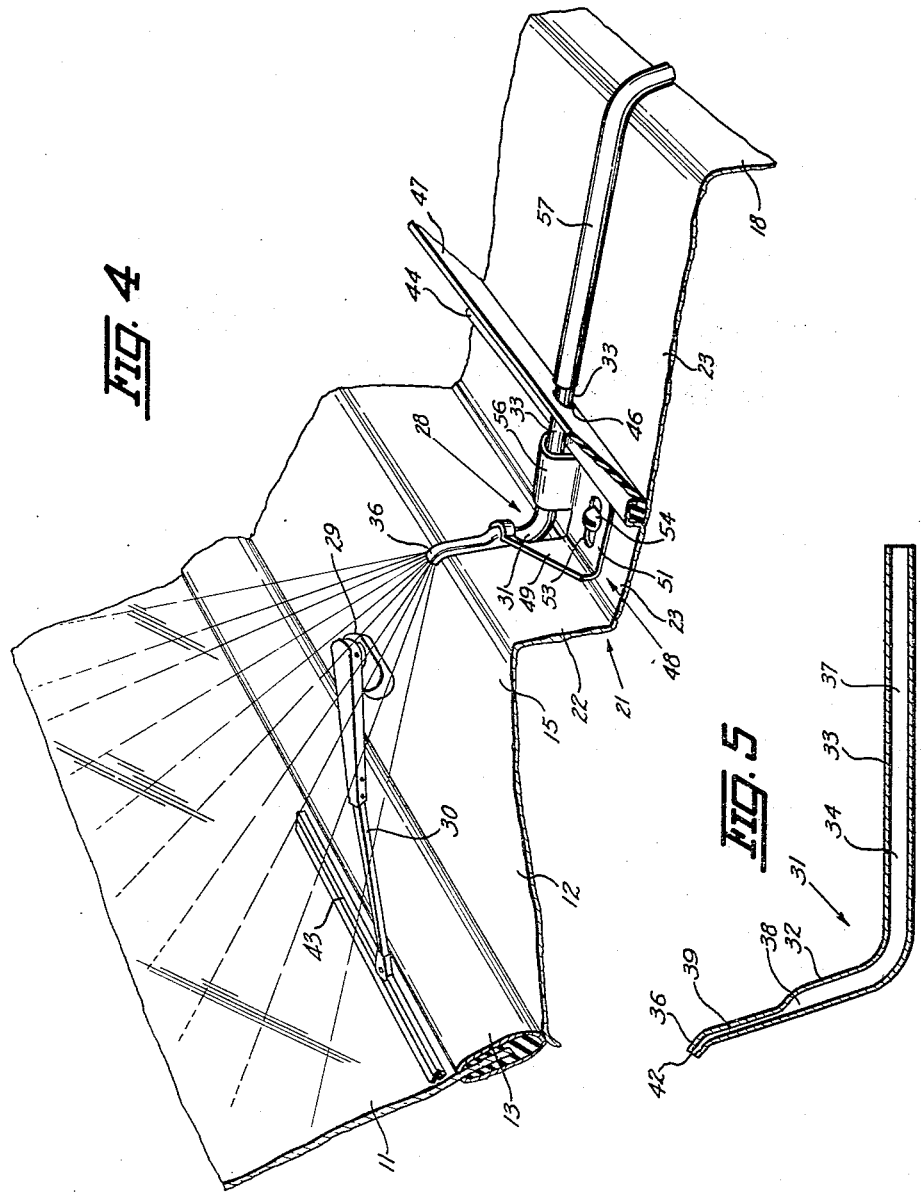
INVENTOR.
EDMOND F. WEBB
BY
ATTORNEY.

Nov. 22, 1960 E. F. WEBB 2,961,168
NOZZLE DEVICE FOR WINDSHIELD CLEARING SYSTEMS
Filed April 26, 1957 2 Sheets-Sheet 2
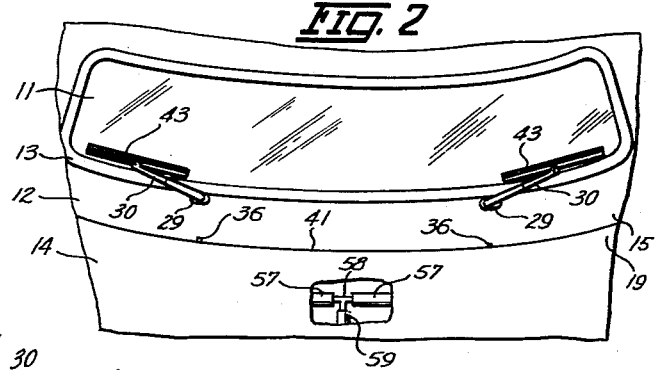
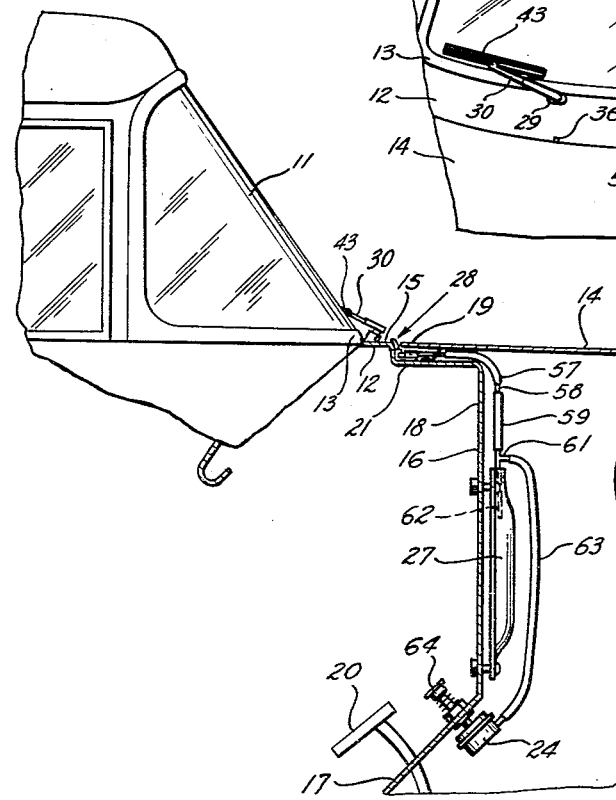
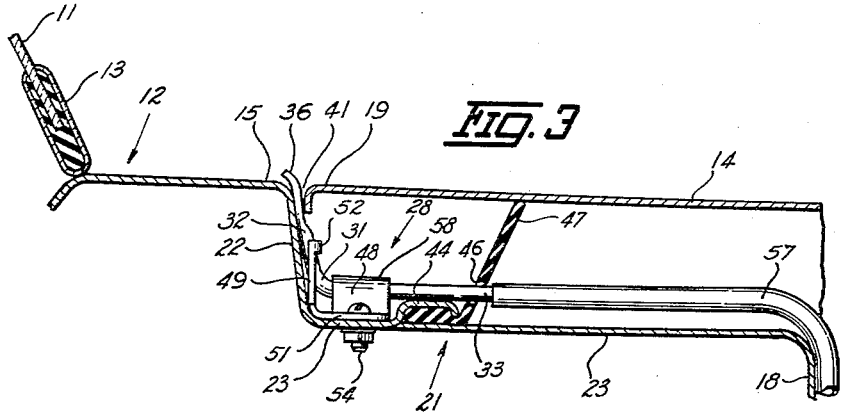
INVENTOR.
EDMOND F. WEBB
BY Rudolph L. Lowell
ATTORNEY.

United States Patent Office 2,961,168
Patented Nov. 22, 1960

2,961,168

NOZZLE DEVICE FOR WINDSHIELD CLEARING SYSTEMS

Edmond F. Webb, Franklin, Mich., assignor to The Delman Company, Cookeville, Tenn., a corporation of Tennessee Filed Apr. 26, 1957, Ser. No. 655,280

1 Claim. (Cl. 239—284)

This invention relates generally to automobile windshield clearing systems and more particularly to a nozzle unit in such a system for directing a stream of fluid onto the windshield.

An object of this invention is to provide an improved nozzle unit.

A further object of this invention is to provide a nozzle unit for an automobile windshield clearing system adapted to be mounted on the automobile so as to extend between the front edge of the cowl and the rear edge of the hood, and having a discharge nozzle for directing a jet of fluid into the path of travel of the usual windshield wiper.

Another object of this invention is to provide a nozzle unit which is of a simplified construction, economical to manufacture, and efficient in operation.

Further objects, features and advantages of this invention will appear from the following description when taken in connection with the accompanying drawings, in which:

Fig. 1 is a fragmentary foreshortened longitudinal sectional view of an automobile showing a windshield clearing system, embodying the nozzle unit of this invention;

Fig. 2 is a fragmentary perspective view of an automobile showing the nozzle unit installed on the automobile, with parts being broken away for the purpose of clarity;

Fig. 3 is an enlarged fragmentary sectional view of the nozzle assembly, illustrated similarly to its showing in Fig. 1;

Fig. 4 is a fragmentary perspective view of the nozzle assembly shown in Fig. 3; and Fig. 5 is an enlarged longitudinal sectional view of the nozzle unit.

With reference to the drawings, there is illustrated in Fig. 1 a windshield clearing system as applied to an automobile having a windshield 11, an engine cowl 12 extended forwardly from the lower front edge 13 of the windshield 11, and an engine hood 14 positioned forwardly of the front end 15 of the cowl 12 and spaced therefrom. The automobile is further equipped with the usual fire wall 16 and an upwardly and forwardly inclined floorboard section 17 which joins with the lower end of the fire wall 16.

The front end 15 of the cowl and the upper end 18 of the fire wall 16, which terminates at a position below and forwardly of the rear end 19 of the hood 14 (Fig. 3), are joined by a step unit 21, which comprises a flange 22 depending from the front end 15 of the cowl, and a shoulder or ledge portion 23 which extends forwardly from the bottom of the flange 22 to the upper end 18 of the fire wall 16.

The windshield clearing system includes a pump system 24 (Fig. 1), supported on the underside of the floorboard section 17 adjacent the automobile clutch pedal 20, and a fluid reservoir or container 27 supported on the front side of the fire wall 16. The fluid reservoir 27 carries fluid for a pair of identical nozzles or fluid discharge units 28 secured to the step unit 21 at positions generally forwardly of the shafts 29 for the windshield wiper arms 30.

Each nozzle unit 28 (Figs. 3, 4 and 5) consists of a generally L-shaped tubular body member 31 which includes a short leg section 32 and a long leg section 33. As shown, particularly in Fig. 5, the leg sections are joined at an obtuse angle for the primary reason of obviating, as much as possible, a restriction to the flow of a fluid through a passage 34 extended through the body member 31. The tip or discharge end 36 of the leg 32 is bent so as to extend in an angular direction away from the leg 33.

The fluid passage 34 is of a uniform diameter 37 throughout the leg 33 and through the leg 32, to the portion 38, wherein the diameter is progressively reduced to a smaller diameter 39 that continues through the remainder of the leg 32 and its tip end 36. The reduction of the diameter of the fluid passage at 38 (Fig. 5) is obtained by flattening out one side of the upper portion of the leg 32 and the tip 36 relative to the tubular lower portion of the leg 32 from 38 down to the junction with the leg 33, whereby to form a shoulder between the portions, while retaining the other side of the leg 32 in a straight line throughout its entire length, as best illustrated in Fig. 5. It is to be noted that the length of the discharge end 36 is relatively short as compared to the length of the leg sections 32 and 33, for a purpose hereinafter disclosed.

In the assembly of the nozzle unit 28 (Fig. 3), the leg section 33 is placed adjacent the shoulder portion 23 of the step unit 21, and the leg section 32 is placed adjacent the depending flange 22 of the step unit, so that the discharge end 36 extends through a space 41 defined by the front end 15 of the cowl 12 and the rear end 19 of the hood 14. The leg section 33 of the nozzle unit 28 rests upon a raised passage-forming part 44 (Fig. 3) of the shoulder portion 23, and extends through a hole 46 cut in a weather strip 47, which is secured in place by the part 44. When thus positioned, the discharge end 36 faces the windshield 11 so that a stream of fluid discharged from the orifice 42 (Fig. 5) at the discharge end is directed against that part of the windshield 11 which is in the path of a usual windshield wiper 43 (Figs. 2 and 4).

A metal clip 48 (Fig. 4) secures the body member 31 to the step unit 21, and comprises a pair of right angular flanges 49 and 51. The upright flange 49 rests against the depending flange 22 of the step unit and has a shoulder 52 formed for contiguous support of the leg section 32, and the flange 51 has a slot 53 formed therein, through which a bolt 54 may be inserted for securing the clip 48 to the shoulder portion 23. A circular shoulder 56 extends from one side of the flange 51 and clamps over the leg section 33 for securement thereof.

When both of the nozzle units 28 have been thus assembled to the step unit 21 (Fig. 2), a pair of tubes 57, connected to opposite ends of a T-connection 58, are attached to the leg sections 33. The third end of the T-connection 58 is connected through a tube 59 to a three-way valve 61 mounted on the fluid reservoir 27. A tube 62 supplies the three-way valve 61 with fluid from the reservoir 27, and a flexible tube 63 connects the valve 61 and the pump 24 which is operated by depressing a foot operated plunger 64, which projects upwardly from the floorboard 17.

In the operation of the windshield clearing system, on actuation of the foot operated plunger 64 fluid under pressure is forced through the flexible tube 63 and into the three-way valve 61 which is opened by the fluid pressure to admit fluid through the flexible tubes 59 and 57 to the fluid discharge units 28, concurrently with the closing of the tube 62 to the reservoir 27. This fluid is ejected from the discharge orifices 42 as jets of fluid directed against the windshield 11. When the plunger 64 is released, fluid is drawn from the reservoir 27 into the pump 24. In other words, fluid is discharged from the discharge orifices 42 when the plunger 64 is depressed, and drawn into the pump 24, for subsequent discharge, when the plunger 64 is released.

From the above description it is seen that a simplified nozzle unit 28 has been provided which is attachable to a step portion extending between the front edge of the engine cowl to the top of the fire wall, whereby the discharge end 36 of the nozzle unit extends through a space formed between the front end of the cowl and the rear end of the hood and is faced toward the windshield 11 to direct a stream of fluid onto a desired portion thereof. As a result, no drilling of holes for the nozzle unit is required in the cowl or hood; the nozzle unit is substantially hidden from view, and the directional adjustment of the fluid jet for striking the desired portion of the windshield is positively maintained by the clip member 48.

Although the invention has been described with respect to a preferred embodiment thereof, it is to be understood that it is not to be so limited since changes can be made therein which are within the full intended scope of this invention as defined by the appended claim.

I claim:

In a windshield clearing system for an automobile having a windshield, an engine cowl extending forwardly from said windshield, and a hood spaced from and extending forwardly from said cowl; a discharge nozzle comprising a body member having a fluid passage extended therethrough and including three straight leg sections joined in series, said leg sections lying in one plane in a plan view and angularly related each to the others in an elevational view, a first of said leg sections adapted to be horizontally disposed whereby a second leg section extends upwardly and outwardly from one end of said first leg section at an obtuse angle therewith, and wherein a third leg section which is considerably shorter than either said first or second leg sections extends upwardly and outwardly from an end of said second leg section so as to increase said obtuse angle relative the longitudinal axis of said first leg section, said fluid passage having a uniform cross sectional area extending through said first and part of said second leg section whereat said area is decreased by a deforming flattening of the remainder of said second leg section, the decreased cross sectional area then extending consistently through the remainder of the second leg section and the entire length of said third leg section, the arrangement being such that said flattened remainder of said second leg section is adapted to be located between said cowl and said hood.

References Cited in the file of this patent

UNITED STATES PATENTS

| | | |
|---|---|---|
| 840,769 | Harmer | Jan. 8, 1907 |
| 1,090,347 | Schofield | Mar. 17, 1914 |
| 2,105,676 | Stow | Jan. 18, 1938 |
| 2,306,778 | Carnez | Dec. 29, 1942 |
| 2,323,470 | Horton et al. | July 6, 1943 |
| 2,703,258 | Neufeld | Mar. 1, 1955 |
| 2,753,910 | Neufeld | July 10, 1956 |
| 2,770,017 | Oishei et al. | Nov. 13, 1956 |